United States Patent
Tormasov et al.

(10) Patent No.: US 7,650,473 B1
(45) Date of Patent: *Jan. 19, 2010

(54) SECURE DELETION OF INFORMATION FROM HARD DISK DRIVE

(75) Inventors: Alexander G. Tormasov, Moscow (RU); Serguei M. Beloussov, Singapore (SG); Maxim V. Tsypliaev, Moscow (RU); Maxim V. Lyadvinsky, Moscow (RU)

(73) Assignee: Acronis Inc., Tortola (VG)

( * ) Notice: Subject to any disclaimer, the term of this patent is extended or adjusted under 35 U.S.C. 154(b) by 370 days.

This patent is subject to a terminal disclaimer.

(21) Appl. No.: 11/776,514

(22) Filed: Jul. 11, 2007

Related U.S. Application Data

(63) Continuation of application No. 11/001,128, filed on Dec. 2, 2004, now Pat. No. 7,275,139.

(51) Int. Cl.
*G06F 13/00* (2006.01)
(52) U.S. Cl. .................................. 711/154; 726/26
(58) Field of Classification Search ................. 711/154; 726/26
See application file for complete search history.

(56) References Cited

U.S. PATENT DOCUMENTS 6,314,437 B1 * 11/2001 Starek et al. ................. 707/206
6,772,310 B2 * 8/2004 Thompson et al. ........... 711/166
2006/0031651 A1 * 2/2006 Nonaka et al. ............... 711/163

OTHER PUBLICATIONS

Gutmann, Peter, Secure Deletion of Data from Magnetic and Solid-State Memory, Jan. 10, 2003, USENIX, Proceedings of The Sixth USENIX Security Symposium, [online] retreived Sep. 9, 2009, [url=http://www.usenix.org/publications/library/proceedings/sec96/full_papers/gutmann/], pp. 77-90.*

* cited by examiner

*Primary Examiner*—Christian P Chace
*Assistant Examiner*—Jared I Rutz
(74) *Attorney, Agent, or Firm*—Bardmesser Law Group

(57) ABSTRACT

A method of securely deleting data from a storage medium includes generating a bitmap that corresponds to unused locations on the storage medium; initiating a background process that wipes the unused locations, where the background process runs asynchronously with a user application; wiping the unused locations; and updating the bitmap to reflect that the unused locations have been wiped. The wiping replaces data at the unused locations with random sequences, with pseudo-random sequences, with data generated by a secure deletion algorithm, with application data from the user application, or with all zeros. The wiping includes repeated writing of predetermined sequences to the unused locations. The wiping replaces data at unused locations that represent portions of any of blocks, clusters and sectors, and can wipe any metadata associated with files previously stored at any of the unused locations. Upon a request for access of data from a wiped location, data that does not correspond to data originally stored at the wiped location can be returned.

22 Claims, 3 Drawing Sheets

SECURE DELETION OF INFORMATION FROM HARD DISK DRIVE

CROSS REFERENCE TO RELATED APPLICATIONS

This application is a continuation of U.S. patent application Ser. No. 11/001,128, filed Dec. 2, 2004, entitled SECURE DELETION OF INFORMATION FROM HARD DISK DRIVE, now U.S. Pat. No. 7,275,139, which is incorporated herein by reference in its entirety.

BACKGROUND OF THE INVENTION

1. Field of the Invention

The present invention is directed to deletion of information from storage media, and more particularly, to secure and reliable deletion of information from magnetic storage drives.

2. Background Art

It is well known in the art that deletion of a file using operating system commands, or deletion of some other unit of information, from a hard disk drive does not actually erase the bits. Normally, a file allocation table (FAT), or some other mechanism used by the operating system to keep track of file locations, is modified, to indicate that the space previously occupied by the file is now empty, and can be written into by the operating system or by application programs. The information that was previously stored at that location may eventually be overwritten. However, this may take a finite period of time, while the information still remains at its previous location on the hard drive, and can be recovered. Additionally, even overwriting the freed-up sectors with new information does not necessarily reliably erase the information, since techniques exist that permit recovery of the bits stored on the hard drive even after several writes to that particular bit location.

Normally, an operating system will return an error upon an attempt to read a file that has been deleted. However, there are many utilities available that access particular regions, or sectors, on the disk drive directly, bypassing the operating system.

In fact, various utilities exist, such as Norton Unerase™, that do precisely that—look for "empty" sectors on the hard drive, and attempt to restore the files that were nominally deleted.

In other words, it is not sufficient to rely on operating system mechanisms to ensure that a "deleted" file can never be recovered. For security reasons, this state of affairs is frequently unacceptable.

The conventional approach to addressing this problem is to use various utilities that identify unused, or empty, sectors on a hard disk drive, and then write new information to those sectors repeatedly and/or randomly and/or based on some algorithm, in order to ensure that the original file content is securely erased. There are several problems with the conventional approach. First, the overhead associated with it is fairly high. For large network drives, for instance, 100 gigabyte drives, if 50% of the drive has to be "wiped" (i.e., securely erased) in this manner, this process can take hours. In the meantime, the areas being wiped are unavailable to the operating system for storage.

Second, this process does not wipe in-line file information. In-line file information is information that is stored within the file structure directory itself (as opposed to being part of the "general" data files). Also, frequently, very small files are written to the directory itself, for faster access.

Third, the conventional approach does not erase so-called "sub-cluster" files, in other words, files that are very small, e.g., a few bytes in size, several of which can be stored in the same sector.

Accordingly, there is a need in the art for a reliable and secure deletion of both file contents and any metadata associated with the file, such as file size, creation date, and other file attributes, to a point where recovery of such information is impossible.

SUMMARY OF THE INVENTION

The present invention relates to secure deletion of information from hard disk drive that substantially obviates one or more of the disadvantages of the related art.

More particularly, in an exemplary embodiment of the present invention, a system, method and computer useable medium having computer program logic stored thereon for executing on at least one processor, for securely deleting data from a storage medium includes generating a bitmap that corresponds to unused locations (or to other locations that need to be wiped) on the storage medium; initiating a background process that runs in parallel with a user application and wipes the unused locations; wiping the unused locations; and updating the bitmap to reflect that the unused locations have been wiped. The wiping can also replace data at the unused locations with random sequences, with pseudo-random sequences, with data generated by a secure deletion algorithm, with application data from the user application, with all ones or zeros or any predefined pattern. The wiping can also include repeated writing of predetermined sequences to the unused locations. The unused locations correspond to any of blocks, clusters and sectors. The storage medium can be a hard disk drive. The wiping can also include replacing data at unused locations that represent portions of any of blocks, clusters and sectors. The wiping can also include wiping any metadata associated with files previously stored at any of the unused locations. The bitmap can correspond to all unused locations on the storage medium. Upon a request for access of data from a location that has to be wiped, data that does not correspond to data originally stored at the wiped location can be returned. The bitmap can identify deleted files, and/or inline files, and/or temporary files that are not used by any user applications.

In another aspect of the invention, a system securely deletes data from a storage medium while a user application is running in user space. A bitmap that corresponds to unused locations on the storage medium and keeps track of unused locations. A background process wipes the unused locations and updates the bitmap to reflect that the unused locations have been wiped. The background process replaces data at the unused locations with random sequences, or with pseudo-random sequences, or with data generated by a secure deletion algorithm, or with application data from the user application, or with a predefined pattern, e.g., all ones or all zeroes. The background process repeatedly writes predetermined sequences to the unused locations. The unused locations correspond to any of blocks, clusters and sectors. The background process replaces data at unused locations that represent portions of any of blocks, clusters and sectors. The background process wipes any metadata associated with files previously stored at any of the unused locations.

In another aspect, a system for securely deleting data from a storage medium including a computer having a processor; a bitmap that determines locations to be wiped on the storage medium; and a background process running on the processor and that wipes the locations and updates the bitmap to reflect that the locations have been wiped. The background process runs independently of file access requests issued by the user application. Upon an attempt to write data to one of the locations by the user application, this location is first wiped, and then the user application's data is written to this location.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
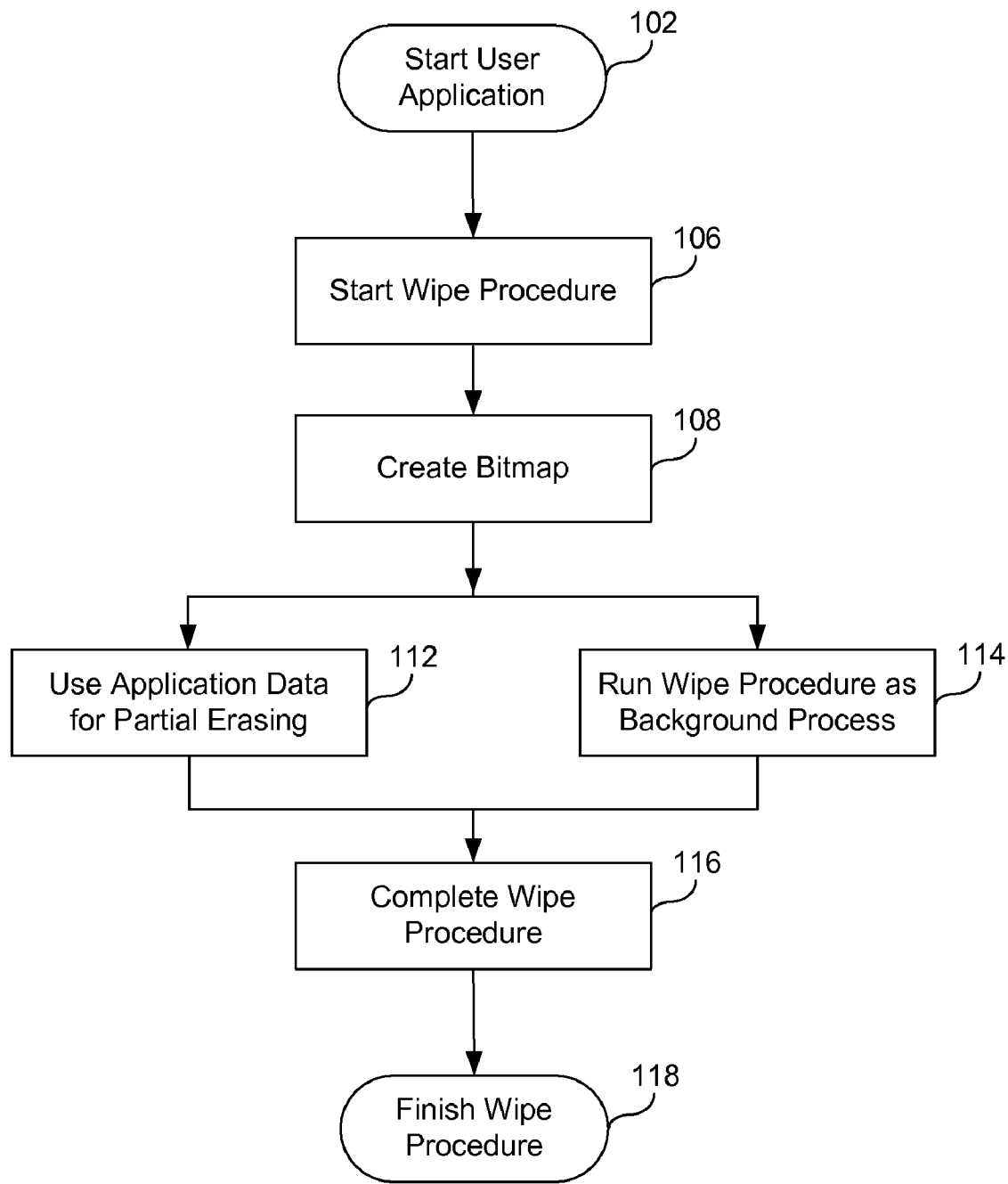
FIG. 1 illustrates one exemplary embodiment of the present invention.

Reference will now be made in detail to the preferred embodiments of the present invention, examples of which are illustrated in the accompanying drawings.

In the present invention, file and data deletion is accomplished online, in other words, without interruption of any application or OS activity. Since the process of accessing the disk drive runs in operating system kernel space, a background process that gradually wipes the information from the hard disk drive is launched in operating system kernel space, asynchronously with user applications. Alternatively, the process of wiping data from the hard disk drive may be launched in the user space, also asynchronously with the user applications. The locations that have been wiped can then be used for storing the user application's data.

The present invention uses a bitmap to keep track of which blocks, clusters, and/or sectors (or their portions) are used, and which ones are empty. The bitmap thus represents the sectors that are identified as needing to be wiped. Once a particular sector has been wiped, the corresponding bit in the bitmap is reset (or changed). For example, in the bitmap, a sector that needs to be wiped has a 1 corresponding to it. Once the sector has been wiped, the 1 is reset to a 0.

In an alternative embodiment, the sector that needs to be wiped can have more then one bit corresponding to it in the bitmap. This can be used in the case when the wiping process requires multiple writes to the same location on the disk using different patterns, for example, based on the U.S. Department of Defense clearing standard DOD 5220.22-M. The bitmap can specify the number of overwrite passes. Therefore, each such overwrite can be accompanied by a corresponding change in one or more bits in the bitmap.

The present invention can overwrite the data to be wiped using a random or pseudo-random pattern of bits. Alternatively, the present invention can first erase the data completely (set all the bits to 0), and then write a random or pseudo-random pattern of bits to the same locations. As yet another alternative, various algorithms exist that write predefined bit patterns designed to defeat attempts at recovery of the data. After such patterns are written, it is empirically provable that the original data is not recoverable, and the deletion is "secure."

In an alternative embodiment, additional bits in the bitmap can signify that the block should be partially erased. E.g., the bitmap can have bits that are related to space allocated to inline files, to the file allocation table, and optionally to various operating system areas. In the Microsoft Windows context, this can be, for instance information stored in MFT, or Master File Table. In the Unix context, such a table is known as "superblocks." Files with multiple data streams, as is implemented in NTFS (New Technology File System), and parts of paging files (page files, swap files or swap partitions) can be wiped as well.

In certain cases, wiping of a small portions of data can not be directly performed, since writing can only be performed by the operating system on the block (or cluster) level. In other words, there is some smallest storage unit (called, for instance, a "block") that is suitable for transferring to the storage device. For partial erasing of data corresponding to portions of such a blocks, a modified method is used.

First, a part of the block that contains actual data is copied to an intermediate location. Then, the original block is wiped. Desired data are then copied back to the block from the intermediate location. It should be noted that only the desired part of the block is restored in the original block. Other data in the same block is either discarded or substituted by the pattern that does not correspond to the original data.

FIG. 1 illustrates one exemplary embodiment of the present invention. As shown in FIG. 1, a user application is started (step 102). It should be noted that, alternatively, some operating system process can be started instead of, or in addition to the user application. It should also be noted that the situation where no user applications or OS processes are running is not very interesting, since in that case there is no need to run the wipe procedure as a background process (discussed further below).

In step 106, the wipe procedure is initiated. In step 108, a bitmap is created. As discussed above, the bitmap represents the sectors, or blocks, or clusters (or some other sub-units, or their portions, of the hard drive) that remain to be wiped, or still need to be wiped. At the end of the wipe process, all the bits in the bitmap will be marked or unmarked, e.g. set to 0.

Steps 112 and 114 should be conceptually viewed together. In step 114, the wipe procedure runs as a background process, without requiring the need for a freezing or suspension of the user application. In step 112, which can run in parallel with step 114, application data can be used for partial erasing, or wiping. In other words, if a particular application overwrites one of the sectors, or blocks or clusters that is intended for wiping according to the bitmap, then step 114 need not be performed on that block, sector or cluster. The bitmap should be updated accordingly.

Step 116 completes the wipe procedure, and finishes whatever housekeeping matters remain (e.g., timestamps, etc.). in step 118, the process ends.

Optionally, a user application can delete a file at the same time as the wipe procedure is running in the background. In that case, the bitmap can be modified to reflect the addition of new blocks or sectors that need to be wiped, during the execution of the wipe procedure.

As yet another option, if it is necessary to ensure that the old data cannot be recovered using any mechanism that recovers "erased" bits from the hard drive, it is also possible for the wipe procedure to "handle" blocks or sectors that have actual data stored in them at the moment (as opposed to just free blocks on the hard disk drive). This can be accomplished by copying the data from the particular non-empty block to some intermediate location, erasing the block, writing some predetermined bit pattern to the block (or wiping it using some other procedure), and then writing the original data back from the intermediate location to the original block. Alternatively, this can be accomplished by copying a used part of the block to some intermediate location, wiping the block, and then writing the data from the intermediate location to the block.

Note that this level of security is rarely necessary in commercial systems, although many military and government systems can require it, based on the particular application and the level of security required of the particular storage.

In Windows operating system, an interrupt request packet (IRP) is a request to the OS kernel to perform some action relating to the storage device, such as a WRITE to or a READ from the storage device. Note that IRP's sometimes go by other names (depending on the hardware and operating system involved), but, in general, perform the above function. In this discussion, IRP's directed to reading or writing data from/to the storage device are primarily at issue. Other IRP's, such as control IRP's or drive condition requests, are treated as they would be treated in normal OS operation mode. In other words, such IRP's are passed to low level drivers. Detailed description of a treatment such an IRP's is outside the scope of this discussion.

Figure 2:
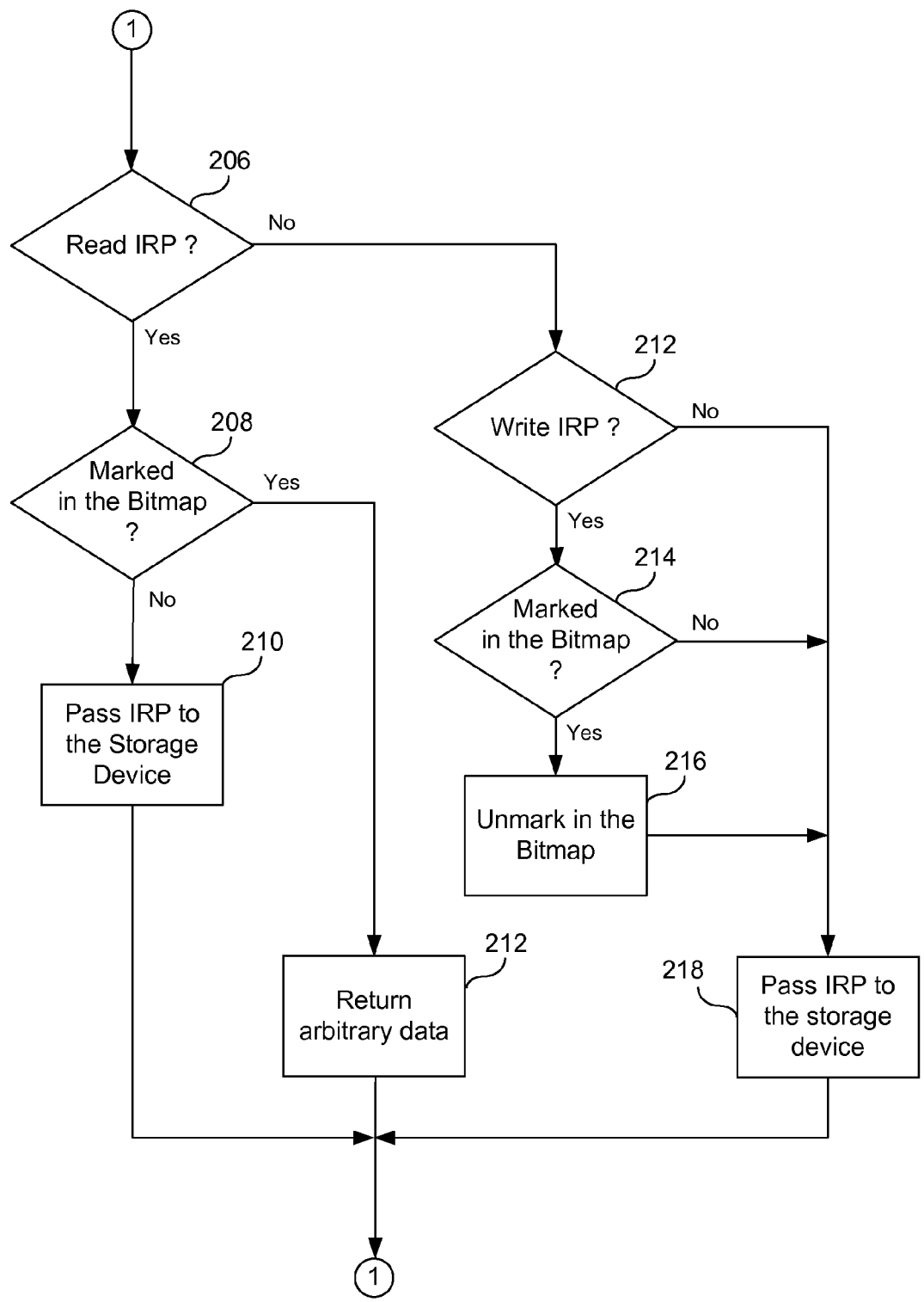
FIG. 2 illustrates how interrupt request packets (IRPs) are handled in the present invention.

FIG. 2 illustrates how IRPs are handled in the present invention. Since it is possible that a user application or some other process could try to access the location that is in the process of being wiped by the background process, these two processes should not conflict with each other. This is done by the use of a replacement driver.

In step 206, it is determined whether the IRP is a READ IRP (i.e., directed to reading data from the storage device). If it is a READ IRP then, in step 208, it is determined whether the particular block is marked in the bitmap. If the block is not marked in the bitmap, then the IRP is passed to the storage device (step 210). In other words, the IRP is treated as it would be in normal OS read operation mode. If, in step 208, the block is marked in the bitmap, then arbitrary data is returned (step 212). "Arbitrary data" may be all zeros, may be all ones, may be encrypted in some way, or may be thought of as (in some sense) invalid data. In other words, "arbitrary data" in this context refers to data that does not correspond to the data that is actually stored there. Such data may be completely random, pseudo-random, or generated by some other algorithm, so long as it does not correspond to the data that is actually stored on the block that is being accessed.

If, in step 206, the IRP is not a READ IRP then, in step 212, it is determined whether the IRP is a WRITE IRP. If it is not, then the IRP is passed to the storage device (step 218). If the IRP is a WRITE IRP then, in step 214, it is determined whether the block is marked in the bitmap. If it is not, the process proceeds to step 218. If it is marked in the bitmap, then the particular bit is unmarked (step 216). The process then proceeds to step 218. Following steps 210, 212, or 218, the process cycles back to step 206.

Figure 3:
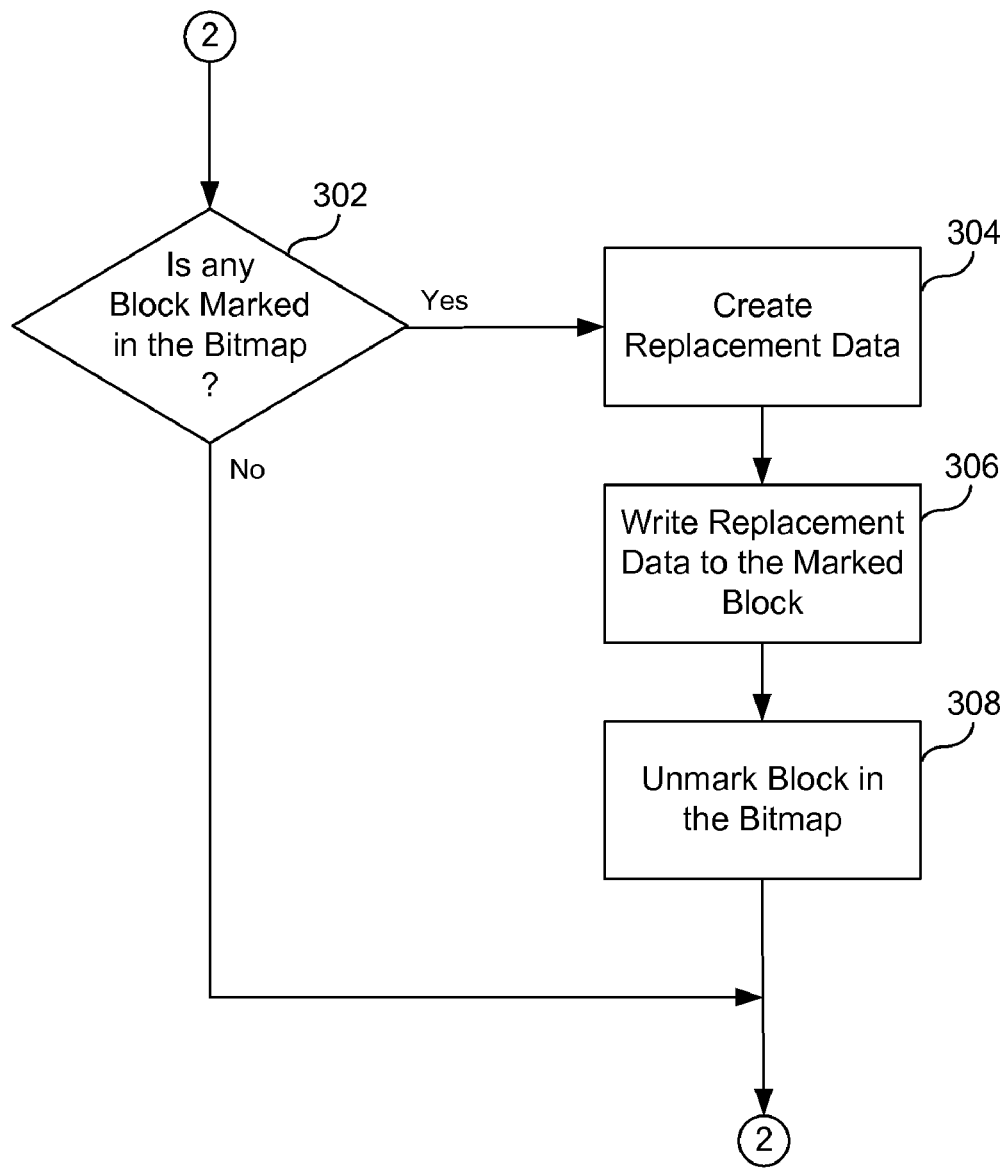
FIG. 3 illustrates the background wiping process in more detail.

FIG. 3 illustrates the background wiping process in more detail. As shown in FIG. 3, in step 302, the system checks whether any block is marked in the bitmap. If no block is marked, then the background process terminates. If there are blocks that are marked in the bitmap, then replacement data for that block is created (step 304). The replacement data is then written to the marked block (step 306). The block is then unmarked in the bitmap (step 308). The process then cycles back to step 302 or terminates at user discretion. Access to the bitmap can be properly synchronized typically by using locks, mutexes, semaphores and other OS synchronization primitives.

Having thus described an embodiment of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of securely deleting data from a storage medium, the method comprising:

generating a bitmap that determines locations to be wiped on the storage medium;

initiating a background process that wipes the locations, the background process running independently of file access requests issued by the user application, the background process wiping the locations, and updating the bitmap to reflect that the locations have been wiped, wherein, upon an attempt to write data to one of the locations by the user application, this location is first wiped, and then the user application's data is written to this location.

2. The method of claim 1, further comprising updating the bitmap after the user application has written data to one of the locations to reflect that this location has been wiped.

3. The method of claim 1, wherein the wiping further comprises:

copying data of at least some locations to intermediate storage;

wiping the at least some locations; and copying the data from the intermediate storage back to the at least some locations.

4. The method of claim 1, wherein the wiping further comprises writing any of the following to the locations: random sequences of data, pseudo-random sequences of data, data generated by a secure deletion algorithm, and a predefined pattern.

5. The method of claim 1, wherein the wiping further comprises repeated writing of data to any unused locations.

6. The method of claim 5, wherein the unused locations correspond to any of clusters, sectors, sets of clusters, portions of sectors, and portions of clusters.

7. The method of claim 1, wherein the storage medium is a hard disk drive.

8. The method of claim 1, wherein, upon a read request for data from one of the locations, data that does not correspond to data originally stored at that location is returned.

9. The method of claim 1, wherein the locations are unused locations.

10. The method of claim 9, further comprising wiping any metadata previously stored at any of the unused locations.

11. The method of claim 10, wherein the metadata is associated with deleted files.

12. A system for securely deleting data from a storage medium comprising:

a computer having a processor;

a bitmap that determines locations to be wiped on the storage medium; and a background process running on the processor and that wipes the locations and updates the bitmap to reflect that the locations have been wiped, wherein the background process runs independently of file access requests issued by the user application, and wherein, upon an attempt to write data to one of the locations by the user application, this location is first wiped, and then the user application's data is written to this location.

13. The system of claim 12, wherein the background process replaces data at the locations with any of the following: random sequences of data, pseudo-random sequences of data, data generated by a secure deletion algorithm and a predefined pattern.

14. The system of claim 12, wherein the background process replaces data at some of the locations with application data from the user application.

15. The system of claim 12, wherein the background process repeatedly writes predetermined sequences to the locations.

16. The system of claim 12, wherein the bitmap corresponds to all unused locations on the storage medium.

17. The system of claim 12, wherein the bitmap includes locations that are part of deleted files.

18. The system of claim 12, wherein the bitmap includes locations that are part of inline files.

19. The system of claim 12, wherein the bitmap includes locations that are part of temporary files that are not used by user applications.

20. The system of claim 12, wherein the bitmap includes locations that are part of unused space in a paging file.

21. The system of claim 12, wherein the bitmap includes locations that are part of partially used blocks on the storage medium.

22. A computer useable medium having computer program logic stored thereon for executing on at least one processor, the computer program logic comprising:

computer program code means for generating a bitmap that determines locations to be wiped on the storage medium;

computer program code means for initiating a background process running on the at least one processor that wipes the locations, the background process running independently of file access requests issued by the user application, the background process wiping the locations; and updating the bitmap as locations are wiped, wherein, upon an attempt to write data to one of the locations by the user application, this location is first wiped, and then the user application's data is written to this location.

* * * * *